United States Patent Office 2,949,446
Patented Aug. 16, 1960

2,949,446

COPOLYMERS OF STYRENE AND FLUORINATED DIENES

Francis J. Honn, Westfield, N.J., assignor, by mesne assignments, to Minnesota Mining and Manufacturing Company, St. Paul, Minn., a corporation of Delaware No Drawing. Filed Oct. 27, 1954, Ser. No. 465,135

6 Claims. (Cl. 260—87.5)

This invention relates to novel copolymers of fluorodienes containing at least two fluorine atoms, with styrene.

The synthetic rubber-like substances possess wide utility as a group serving not only as substitutes for natural rubber, but also in some cases, the properties of the individual compositions are superior to the natural product, e.g., in oil resistance and aging charcteristics.

In accordance with the present invention, copolymers of fluorodienes, which are preferably fluorobutadienes, containing at least two fluorine atoms, are produced by copolymerizing the fluorodiene with styrene to produce elastomeric and thermoplastic copolymers which are moldable at temperatures between about 200 and 450° F. into tough, flexible, and clear sheets which are particularly suitable for applications requiring materials possessing a high degree of thermal stability and resistance to strong and corrosive chemicals. The copolymers either in the raw or cured state can also be molded into a variety of shaped articles using conventional molding techniques and equipment. The copolymers are also useful as thermally and chemically resistant protective coatings which are particularly valuable as coatings on metal, wood, and fabric surfaces including the use of the copolymer as an electrical insulating material.

The copolymers are vulcanizable, and the vulcanizates have improved fuel resistance to aromatic and hydrocarbon fuels, compared to the resistance of polystyrene.

The fluorobutadienes which are preferably employed in the process of the invention to produce the desired copolymers have the formula

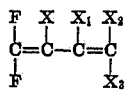

in which X and $X_1$ may be hydrogen, fluorine, or alkyl radicals, the alkyl radicals preferably having from 1 to 3 carbon atoms, and $X_2$ and $X_3$ are identical and are hydrogen or fluorine. Exemplary of the fluorobutadienes contemplated are 1,1-difluorobutadiene, 1,1-difluoro-3-methyl butadiene, 1,1-difluoro-2-methyl butadiene, 1,1,2-trifluorobutadiene, 1,1,3-trifluorobutadiene, 1,1,3-trifluoro-2-methyl butadiene, 1,1,2,4,4-pentafluorobutadiene and 1,1,2,4,4-pentafluoro-3-methyl butadiene. Also contemplated are the corresponding ethyl and propyl substituted butadienes in which ethyl or propyl groups are substituted in the 2 and/or 3 positions.

The copolymers of the invention may contain from about 1 to 99 mole percent of the fluoro-1,3-diene and preferably between about 5 and 95 mole percent. The physical nature of the copolymers will range from oils, greases and waxes to higher molecular weight thermoplastic and elastomeric materials depending upon the particular diene employed and/or the molar charge of monomers. It has been found that the reactivity of these fluorine-containing dienes varies with regard to the extent to which they will copolymerize with styrene, some polymerizing more readily, others less readily, and others at about the same rate as styrene. In order to obtain a copolymer containing between 5 and 95 mole percent of a fluorodiene, such as 1,1-difluoro-2-methyl butadiene, which copolymerizes at a faster rate than styrene, it is necessary to employ an initial molar ratio of fluorodiene:styrene of about 2:98 to about 80:20. When employing a fluorodiene such as 1,1,3-trifluoro-2-methyl butadiene, which leads to copolymers containing less diene than styrene when an equimolar charge of monomers is employed, it is difficult to incorporate more than about 85 mole percent of the fluorodiene into the copolymer. In order to obtain such copolymers containing between about 5 and 85 mole percent of fluorodiene, it is necessary to employ an initial molar charge of fluorodiene to styrene from about 10:90 to about 95:5. Other fluorodiene monomers of the invention, such as 1,1,2-trifluorobutadiene, polymerize at about the same rate as the styrene, and thus copolymers containing between about 5 and 95 mole percent of a fluorodiene may be obtained by using an initial charge ratio of about 5:95 to about 95.5 mole percent of such a fluorodiene:styrene.

The copolymers of the invention may be prepared in various comonomer ratios, as previously described, and by employing the various conventional polymerization recipes. Temperatures employed in the copolymerization reaction may be between about 0° C. and 100° C., with the preferred temperature range being between about 5 to 60° C. The copolymers of this invention are prepared by employing one of a number of free radical promoted polymerization systems. Peroxy type polymerization promoters have been found to be suitable in initiating the desired polymerization reactions and are used in suspension, emulsion, or mass polymerization systems.

Of the water suspension type catalyst systems which may be employed, a redox catalyst system is preferred which comprises an oxidant and a reductant. The oxidant in the water suspension type recipe is preferably an inorganic persulfate, such as potassium persulfate, sodium persulfate, or ammonium persulfate. The reductant is preferably a bisulfite, such as potassium bisulfite, sodium bisulfite, potassium metabisulfite, or sodium metabisulfite. The oxidant in the suspension redox recipe comprises between about 0.1 and 5 parts by weight per 100 parts of total comonomers present, and preferably comprises between 0.5 and 2 parts by weight per 100 parts of total comonomers present. The reductant, for example, sodium metabisulfite, may comprise between about 0.05 and about 5.0 parts by weight per 100 parts of total comonomers present and preferably comprises between about 0.1 and about 2 parts by weight per 100 parts of total comonomers present. A buffer, such as sodium tetraborate, may also be employed, if desired, together with the oxidant and reductant.

Also, about 0.01 to about 1 part by weight per 100 parts of total comonomers present of a variable valence metal salt may be employed. The variable valence metal salt is preferably an iron salt, such as ferrous sulfate or ferrous nitrate, and it is used as an activator. When producing the copolymers of the invention in the persulfate-bisulfite suspension system, it is preferable to operate at a temperature range of about 25° C. to about 60° C., but lower temperatures, i.e., between about 5° C. and about 25° C., are desirably employed when a variable valence metal salt is present in the polymerization system. Also, the reductant and variable valence metal salt may be eliminated, if desired, and a water suspension recipe may be employed which contains only the oxidant.

Alternatively, an emulsion catalyst system, containing water, soap, and a peroxy compound, may also be employed. The different types of emulsion systems may be conveniently differentiated on the basis of the catalyst system employed to initiate the polymerization. One type is that in which the polymerization is initiated by employing a redox catalyst system, comprising between about 0.01 to about 1 part by weight per 100 parts of total comonomers present, of an organic oxidant and an activator solution. Exemplary of the organic oxidants which may be used in the emulsion catalyst system are cumene hydroperoxide, diisopropylbenzene hydroperoxide, tertiary-butyl-isopropylbenzene hydroperoxide, triisopropylbenzene hydroperoxide, methylcyclohexane hydroperoxide, tertiary-butyl perbenzoate, and tertiary-butyl hydroperoxide. A typical activator solution may consist of about 0.01 to 1.0 part by weight per 100 parts of total comonomers present of a variable valence metal salt, for example, ferrous sulfate, about 0.1 to 10.0 parts by weight of sodium pyrophosphate, and about 0.1 to 10.0 parts by weight of a reducing sugar, such as dextrose, fructose, or levulose.

Another type of emulsion catalyst system is that which comprises about 0.05 to 5 parts by weight per 100 parts of total comonomers present of a persulfate as the oxidant, and which preferably comprises between about 0.1 and about 0.5 part by weight of any of the persulfates previously mentioned as being suitable for use in aqueous suspension systems.

The soap employed as the emulsifying agent in either the redox or persulfate emulsion catalyst systems is preferably a metal salt, such as the potassium or sodium salt, derived from saturated aliphatic acids, the optimum chain length of the acid being between about 14 and about 20 carbon atoms, or from polyfluorocarboxylic acids or perfluorochlorocarboxylic acids. The polyfluorocarboxylic acids which may be used are those disclosed in U.S. Patent No. 2,559,752, and the derivatives of the acids disclosed therein as being efficacious dispersing agents in polymerization reactions may also be employed in the process of the present invention. The perfluorochlorocarboxylic acids which may be used in the process of the present invention are those disclosed in copending application Serial No. 463,073, filed October 18, 1954, Patent No. 2,874,152, as being useful as dispersing agents in polymerization reactions. The soap is generally present in a quantity between about 0.5 and about 10 parts by weight per 100 parts of total comonomers present. The emulsion polymerization is desirably conducted under alkaline conditions, and the pH should be maintained between about 9 and 11 in order to prevent gelling of the soap. The pH may be adjusted, if desired, by the addition of suitable buffers.

Of the organic peroxide promoters which may be employed in the mass polymerization system, substituted acetyl peroxides, such as trichloroacetyl peroxide, are preferred. Other suitable organic peroxides are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

The copolymers of this invention may be prepared at pressures ranging from atmospheric pressure to 1200 p.s.i.g. As a matter of convenience, the copolymers are prepared under autogenous conditions of pressure, i.e., about 50–250 p.s.i.g. The reaction time may be between about one hour and 100 hours, preferably about 5 to 75 hours.

Polymerization modifiers may also be employed to reduce the molecular weight of the copolymer products and thereby increase the solubility and ease of processing thereof. Exemplary of such modifiers are chloroform, carbon tetrachloride, trichloroacetyl chloride, bromotrichloromethane, and dodecyl mercaptan. These modifiers are generally added in quantities between about 0.1 to 10 parts by weight per 100 parts of total comonomers charged. Dodecyl mercaptan is the preferred modifier due to the unusual efficacy which it possesses for this purpose.

The invention will be further illustrated by reference to the following specific examples, in which all parts are by weight:

*Example 1*

A polymerization tube was charged with the following ingredients, freezing the mixture after each addition in a freezing bath consisting of a slush of solid carbon dioxide and trichloroethylene:

(1) 180 parts of a soap solution prepared by dissolving 5.0 parts of potassium fatty acid soap in 180 parts of deionized water by stirring and heating at a temperature not in excess of 50° C. When solution was complete, the solution was cooled to room temperature (22° C.) and the pH was adjusted to 10.2; 0.3 part of tertiary-dodecyl mercaptan was added;
(2) 20.0 parts of a solution containing 0.3 part of potassium persulfate;
(3) 50 parts of 1,1-difluoro-3-methyl butadiene; and
(4) 50 parts of styrene.

The polymerization tube was sealed in vacuo at the temperature of liquid nitrogen and placed in a water bath maintained at a temperature of 50° C., and the tube was then shaken for a period of 24 hours. At the end of this period, the tube was frozen, at the temperature of liquid nitrogen, to reduce the vapor pressure of the unreacted monomers and to coagulate the polymer. The contents of the tube were then removed and washed with distilled water until free of soap. The washed contents were then dried to constant weight in vacuo at a temperature of 35° C. A white solid polymeric material was obtained in a quantity representing a 5 percent conversion and upon analysis was found to contain 34 mole percent of combined 1,1-difluoro-3-methyl butadiene and 66 mole percent of combined styrene.

*Example 2*

A polymerization tube was charged with soap and catalyst solutions having the same compositions as those employed in Example 1 above, together with 50 parts of 1,1-difluoro-2-methyl butadiene and 50 parts of styrene. The polymerization was conducted at a temperature of 50° C. for a period of 40 hours following the general procedure of Example 1 above. The white solid polymeric product was obtained in a quantity representing a 92 percent conversion and upon analysis was found to contain 64 mole percent of combined 1,1-difluoro-2-methyl butadiene and 36 mole percent of combined styrene.

*Example 3*

A polymerization tube was charged with the following ingredients freezing the tube in a solid carbon dioxide-acetone bath after each addition:

(1) 20 parts of water solution containing 0.4 part of sodium metabisulfite and 0.5 part of sodium tetraborate;
(2) 160 parts of a soap solution prepared by dissolving 5.0 parts of potassium fatty acid soap in 160 parts of deionized water. The pH was adjusted to 10.2, and 0.2 part of tertiary-dodecyl mercaptan was added;
(3) 20 parts of a 5 percent solution of potassium persulfate;
(4) 51 parts of 1,1,2-trifluorobutadiene; and 49 parts of styrene.

The polymerization was conducted at a temperature of 50° C. for a period of 24 hours, following the general procedure of Example 1 above. The rubbery polymer product was obtained in a quantity representing a 99 percent conversion and was found upon analysis to contain 50.5 mole percent of combined 1,1,2-trifluorobutadiene and 49.5 mole percent of combined styrene.

The copolymer showed excellent molding properties when molded into flexible sheet at a temperature of 300° F.

Example 4

A polymerization tube was charged with the following ingredients freezing the tube in a solid carbon dioxide-acetone bath after each addition:

(1) 20 parts of a water solution containing 0.4 part of sodium meta bisulfite and 0.5 part of sodium tetraborate;
(2) 160 parts of a water solution containing 6.0 parts of ammonium perfluorocaprylate and 0.1 part of dodecyl mercaptan;
(3) 20 parts of a water solution containing 1.0 part of potassium persulfate; and
(4) 53.6 parts of 1,1,3-trifluoro-2-methyl butadiene and 46.4 parts of styrene.

The polymerization was conducted at a temperature of 50° C. for a period of 24 hours, following the general procedure of Example 1 above. A plastic polymeric material was obtained in a quantity representing a 50 percent conversion and upon analysis was found to contain 20 mole percent of 1,1,3-trifluoro-2-methyl butadiene and 80 mole percent of combined styrene.

Example 5

Employing the same activator, emulsion and promoter solutions, polymerization temperature, and reaction time used in Example 3 above, and charging the tube with 58 parts of 1,1,2,4,4-pentafluorobutadiene and 42 parts of styrene, or a total monomer charge containing 50 mole percent of each monomer, produces a resinous thermoplastic copolymer containing at least 20 mole percent of combined $CF_2=CF-CH=CF_2$.

Example 6

The procedure of Example 3 above is repeated except that 46.3 parts of 1,1-difluorobutadiene and 53.7 parts of styrene are charged to the polymerization tube. The product is a resinous thermoplastic copolymer.

Example 7

A polymerization tube was charged with the same activator emulsion and promoter solutions described in Example 3, and was further charged with 51.0 parts of 1,1,3-trifluorobutadiene and 49.0 parts of styrene, corresponding to a total monomer charge containing 50 mole percent of each monomer. The polymerization was conducted for 23 hours at a temperature of 50° C., following the general procedure of Example 3, to obtain an oily polymeric product in about 40 percent conversion.

It will be obvious to those skilled in the art that many modifications may be made within the scope of the present invention without departing from the spirit thereof, and the invention includes all such modifications.

I claim:

1. A process which comprises copolymerizing at a temperature between about 0° C. and about 100° C. a mixture of between about 5 and 95 mole percent of styrene and between about 95 and about 5 mol percent of a fluorinated butadiene selected from the group consisting of 1,1-difluoro-2-methyl butadiene and 1,1-difluoro-3-methyl butadiene, said mixture being in contact with a free radical forming polymerization promoter.

2. The process of claim 1 in which the fluorinated butadiene is 1,1-difluoro-2-methyl butadiene.

3. The process of claim 1 in which the fluorinated butadiene is 1,1-difluoro-3-methyl butadiene.

4. A copolymer of between about 5 and about 95 mol percent of styrene and between about 95 and about 5 mol percent of a fluorinated butadiene selected from the group consisting of 1,1-difluoro-2-methyl butadiene and 1,1-difluoro-3-methyl butadiene.

5. The copolymer of claim 4 in which the fluorinated butadiene is 1,1-difluoro-2-methyl butadiene.

6. The copolymer of claim 4 in which the fluorinated butadiene is 1,1-difluoro-3-methyl butadiene.

References Cited in the file of this patent

UNITED STATES PATENTS

| | | |
|---|---|---|
| 2,490,753 | Hill et al. | Dec. 6, 1948 |
| 2,647,110 | Wiseman | July 28, 1953 |
| 2,668,182 | Miller | Feb. 2, 1954 |
| 2,686,207 | Crane | Aug. 10, 1954 |
| 2,750,431 | Tarrant et al. | June 12, 1956 |

OTHER REFERENCES

Barron: Modern Synthetic Rubbers, London, 1949, pages 41 and 207.

UNITED STATES PATENT OFFICE

CERTIFICATE OF CORRECTION

Patent No. 2,949,446 August 16, 1960

Francis J. Honn

It is hereby certified that error appears in the printed specification of the above numbered patent requiring correction and that the said Letters Patent should read as corrected below.

Column 2, line 22, for "95.5" read -- 95:5 --.

Signed and sealed this 31st day of January 1961.

(SEAL)
Attest:

KARL H. AXLINE
Attesting Officer

ROBERT C. WATSON
Commissioner of Patents